(No Model.) 2 Sheets—Sheet 1.
J. A. LITTLE.
VEHICLE PROPELLING MECHANISM.
No. 605,731. Patented June 14, 1898.
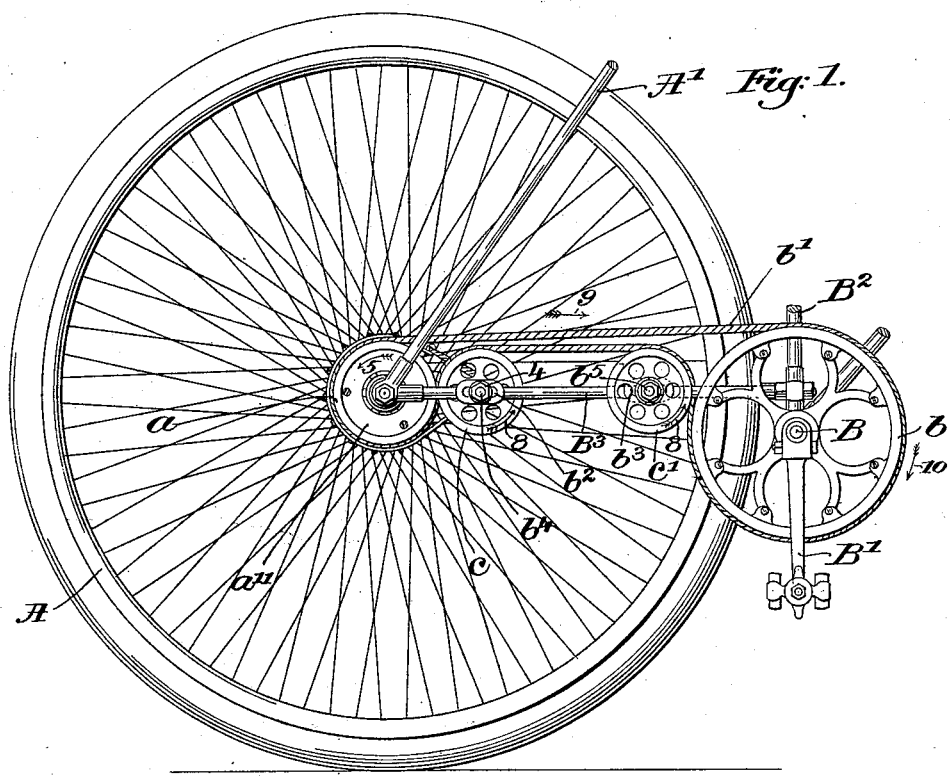
Witnesses:
A. C. Harmon
Thomas J. Drummond
Inventor:
Joseph A. Little.
by Crosby Gregory attys.

(No Model.) 2 Sheets—Sheet 2.
J. A. LITTLE.
VEHICLE PROPELLING MECHANISM.
No. 605,731. Patented June 14, 1898.
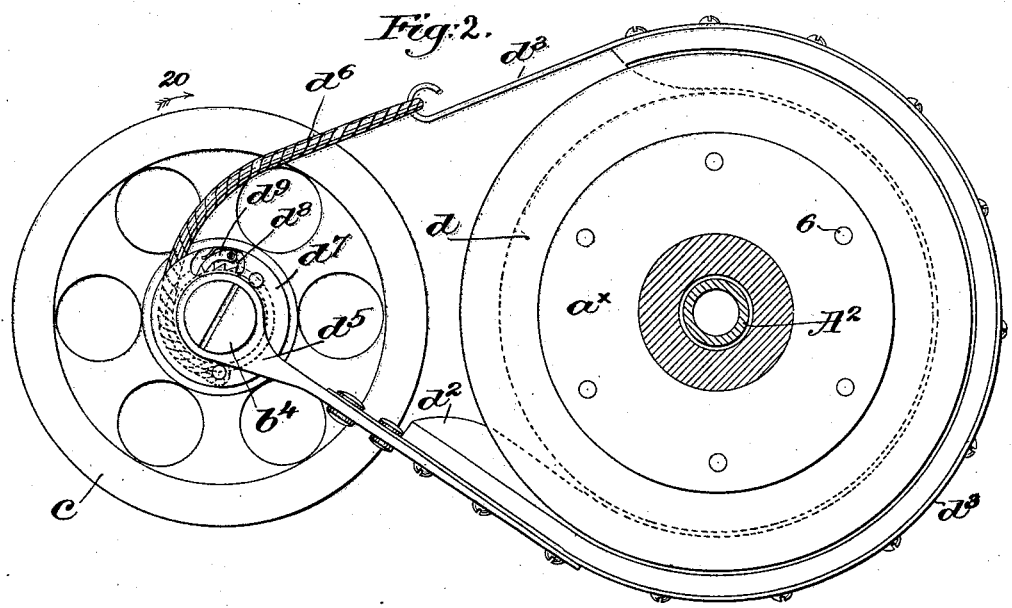
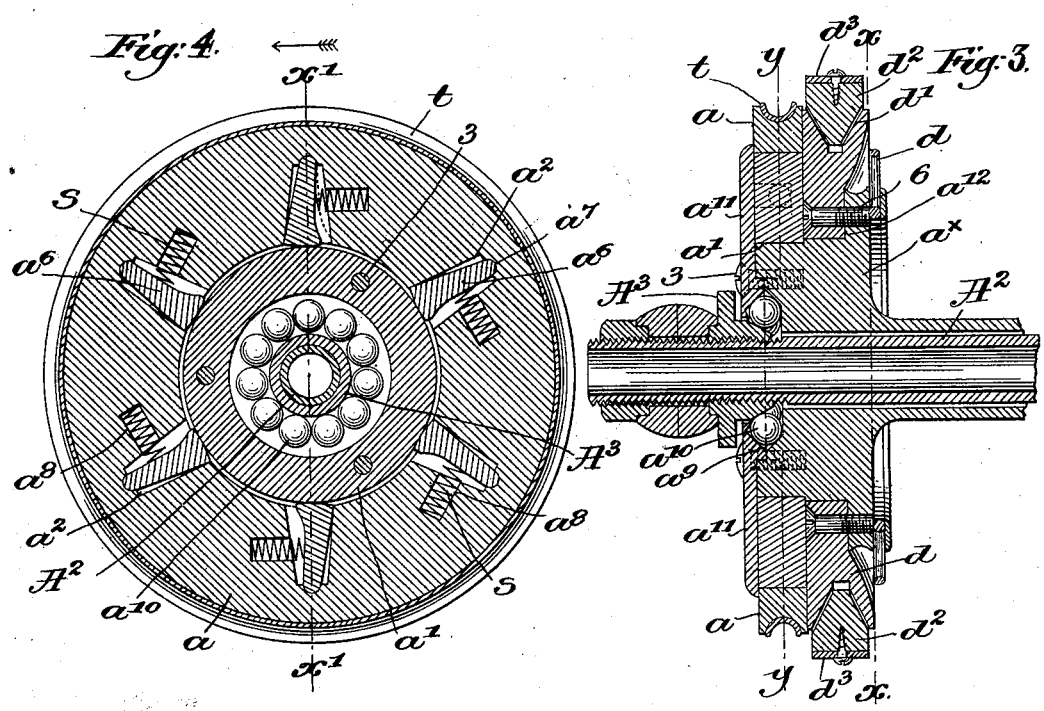
Witnesses
A. C. Harmon
Thomas J. Drummond
Inventor
Joseph A. Little
by Crosby Gregory. Attys.

UNITED STATES PATENT OFFICE.

JOSEPH A. LITTLE, OF LAWRENCE, MASSACHUSETTS, ASSIGNOR OF ONE-HALF TO HUGH P. SIMPSON, OF SAME PLACE.

VEHICLE-PROPELLING MECHANISM.

SPECIFICATION forming part of Letters Patent No. 605,731, dated June 14, 1898.

Application filed October 19, 1894. Serial No. 526,361. (No model.)

*To all whom it may concern:*

Be it known that I, JOSEPH A. LITTLE, of Lawrence, county of Essex, State of Massachusetts, have invented an Improvement in Vehicle-Propelling Mechanism, of which the following description, in connection with the accompanying drawings, is a specification, like letters and figures on the drawings representing like parts.

This invention has for its object the production of propelling mechanism for bicycles and the like, and the various features of my invention will be fully illustrated and described in the accompanying drawings and specification and set forth in the claims.

In the drawings, Figure 1, in side elevation, represents a sufficient portion of the driving-shaft and driving-wheel of a bicycle or similar vehicle to be understood with my invention applied thereto. Fig. 2 is an enlarged view, taken on the line $x\ x$, Fig. 3, of the clutch and brake mechanism applied to the hub of the driving-wheel. Fig. 3 is a sectional view, taken on the line $x'\ x'$, Fig. 4, of the driving-wheel hub and clutch mechanism; and Fig. 4 is a section taken on the irregular line $y\ y$, Fig. 3, looking toward the left—*i. e.*, from side $A^2$ toward line $y\ y$.

I have herein shown my invention as applied to a bicycle or similar vehicle provided with a rear or driving wheel A, rear fork A' therefor, driving or crank shaft B, having usual pedal-cranks B', and a support $B^2$, having suitable bearings (not shown) for said crank-shaft. The sheave $b$ is secured to the crank-shaft B to rotate therewith, the periphery of said sheave being preferably concaved to receive therein the driving-belt $b'$ of suitable cross-section, herein shown as a cylindrical endless band preferably made of wire cable. The belt $b'$ passes over a sheave $a$, herein shown as mounted upon the shoulder $a'$ of the hub $a^{\times}$ of the driving-wheel and radially cut away, as at $a^2$ (see Fig. 4) to receive clutch-dogs $a^6$, the said dogs being rounded at their outer ends, as at $a^7$, to rest in correspondingly-concaved bottoms of the cut-away portions $a^2$, the said dogs bearing upon the shoulder $a'$. Suitable means are provided, herein shown as coiled springs $s$, seated in recesses $a^8$ in the sheave and intersecting the cut-away portions $a^2$, to normally maintain the said dogs in the full-line or inoperative position shown in Fig. 4, the sheave and dogs forming one member of a clutch mechanism to operate the driving-wheel, the hub $a^{\times}$ forming the other member of said clutch mechanism, as clearly shown in Figs. 3 and 4. The inner ends of the dogs $a^6$ are eccentric to the shoulder $a'$ of the hub and when in their normal inoperative position permit the hub and wheel to be rotated in the direction of the arrow, Fig. 4, independently of the sheave. If, however, the sheave is positively rotated in such direction, the friction exerted by the hub upon the dogs $a^6$ will turn them into the dotted-line position to firmly engage with the said hub, or, in other words, throwing the clutch into operative position and positively rotating the driving-wheel. The periphery of the sheave $a$ is concaved and is provided with a friction surface or tire $t$ to receive therein the driving-belt $b'$, rubber forming a good friction-surface for the belt to act upon.

The hub is provided with a recess $a^9$ to receive therein suitable friction-balls $a^{10}$, said balls being retained in position by a cover-plate $a^{11}$, secured to the face of the hub by suitable screws 3, the cover-plate being of sufficient diameter to extend beyond the outer ends of the clutch-dogs $a^6$ to retain them in place in the sheave and also to retain the sheave on the shoulder $a'$ of the hub.

The bushing $A^2$ and the conical bearing-nut $A^3$, forming a part of the bearing for the balls $a^{10}$, are and may be of usual construction, the same forming no part of this my invention.

Owing to the noiselessness of frictional driving-gear when compared with chains, links, or toothed gearing, its use would be greatly extended were it not for the loss of power heretofore encountered in apparatus so constructed, owing to the absence of a proper gripping relation between the driving belt or band and the driven sheave. In this invention I have devised means whereby this desired gripping relation is established, with a consequent enormous increase in tractive effect and general efficiency. In Fig. 1 I have shown a brace $B^3$ as secured to the projecting end of the bushing $A^2$ of the driving-wheel and to the crank-shaft support $B^2$, said brace being slotted at $b^2$ and $b^3$ to receive the ends of studs $b^4$ and $b^5$, suitably secured in adjusted position by set-nuts 4, a gripping roll or sheave, as $c$, being free to rotate upon the inner end of the stud $b^4$, and having a grooved periphery to be engaged by the lower intermediate portion of the belt $b'$ between the sheaves $b$ and $a$, as clearly shown in Fig. 1. This roll is fixed immediately adjacent the sheave $a$, where it serves to maintain the band with a rolling grip in engagement with the peripheral friction-surface of the sheave $a$ at a point on the common normal to the curved surfaces of the sheave and roll. On a stud $b^5$, intermediate the sheaves and adjacent the driving-sheave $b$, is free to rotate a roll or sheave $c'$, also preferably grooved to receive the lower intermediate portion of the driving-belt $b'$ and serving to hold the belt around a large portion of the periphery of the driving-sheave and to direct it freely therefrom to the gripping-roll and driven sheave. To permit removal of the belt $b'$, the rolls may be moved away from their respective sheaves by means of the slots in the brace $b^3$ and the supporting-studs.

Rotation of the crank-shaft B in the direction of the arrow 10, Fig. 1, will cause the upper portion of the belt, which will be under tension, to travel in the direction of the arrow 9, Fig. 1, the lower slack portion, which passes over the rolls $c$ $c'$, traveling in the opposite direction and causing them to rotate in the direction of the arrows 8 thereon, the sheave $a$ being rotated in the direction opposite to that of the arrow 5, Fig. 1, or in the direction of the arrow, Fig. 4, to throw the clutch into operation, as has been described, thereby rotating the driving-wheel and propelling the machine in a forward direction. In coasting, if the rider maintains the crank-shaft B stationary, the clutch will be released by the forward movement of the hub $a^\times$ and the driving-wheel and its hub will rotate entirely independent of the sheave $a$, forming one member of the clutch mechanism. The wheel-hub is cut away to form a shoulder $a^{12}$ between the sheave $a$ and the inner face of the hub, and an annular brake member $d$ rests in and is secured to said shouldered portion by suitable screws 6, the brake member being put in place upon the hub and secured thereto before the sheave $a$ is applied. The periphery of the brake member $d$ is grooved, as shown at $d'$, Fig. 3, and a coöperating compressible brake member, herein shown as a flexible metallic band $d^3$, has secured to the inner side thereof a wedge-shaped strip of leather, rawhide, rubber, or other suitable material to enter the groove $d'$ of the brake member $d$ when the brake is to be applied and stop rotation of the driving-wheel. An eye $d^5$ is formed in one end of the band $d^3$ to receive the stud $b^4$, on which the roll $c$ rotates, the other end of the band being secured by a flexible connection, as $d^6$, to a grooved ring $d^7$, loosely supported upon the stud $b^4$ at the inner side of the roll $c$. In Fig. 2 this ring is partially broken out to show a series of teeth $d^8$ thereon to be engaged by a pawl $d^9$, pivoted to the roll $c$, the pawl being so arranged that it will not engage the ratchet-teeth when the roll is rotated in the direction of the arrow 20, Fig. 2, by the belt $b'$, as it will be when the vehicle is going ahead, but will simply pass over them. When, however, the direction of movement of the belt is reversed, as it would be by back-pedaling, the roll will be rotated in a direction opposite to the arrow 20, Fig. 2, and the pawl $d^9$ will engage the ratchet-teeth $d^8$ and cause the ring $d^7$ to rotate with it, whereby the band $d^3$ will be tightened or compressed, forcing the wedge-like strip $d^2$ firmly into the grooved periphery $d'$ of the brake member $d$ and stopping the rotation of the driving-wheel.

Any suitable clutch mechanism may be used in place of the pawl and ratchet herein shown, so long as the roll forms or controls one member of a normally inoperative clutch, the other member of said clutch being connected to and controlling the operation of the compressible brake member when the clutch is thrown into operation.

From the foregoing description and drawings it will be evident that so long as the vehicle is positively propelled in a forward direction the clutch mechanism between the driving-belt and driving-wheel will be operative to rotate the latter, and at the same time the clutch-like actuator for the brake will be normally inoperative and maintained so by the engagement of a portion of the belt. When, therefore, it is desired to stop or retard the movement of the vehicle, the crank-shaft is rotated in the reverse direction by so-called "back-pedaling," such retrogression simultaneously rendering inoperative the clutch-like brake-actuator, so that the propelling power is removed from the driving-wheel and applied to the brake to retard the rotation of said wheel, making a very effectual and rapidly operative brake mechanism.

Having described my invention, what I claim, and desire to secure by Letters Patent, is—

1. In a bicycle or the like, a crank-shaft, a driving-wheel, a sheave on each, a belt connecting said sheaves, a clutch intermediate said driving-wheel and its sheave whereby rotation of the belt in one direction positively rotates the driving-wheel, free rotation of the belt in the reverse direction being permitted, a guide-roll for and to be rotated by the belt, a brake on the drive-wheel, and connections between said roll and brake, whereby rotation of the belt in the reverse direction and consequent rotation of the roll sets the brake, substantially as described.

2. In a bicycle or the like, a driving-wheel, normally operative clutch mechanism to rotate it in one direction, a crank-shaft, a driving-belt between said shaft and clutch mechanism, combined with a band-brake for the driving-wheel, and an actuator therefor, mounted independently of the driving-wheel and crank-shaft, connections between said actuator and said belt, to positively operate the former by said belt and controlled by the direction of movement thereof, retrograde movement of the belt simultaneously releasing the propelling clutch mechanism and throwing into continuous operation the actuator of the band-brake, substantially as described.

3. In a bicycle or the like, a driving-wheel and a driving-shaft, a sheave on each, a slack belt connecting said sheaves, and a guide-roll adjacent to and to hold the belt against each sheave, with the slack of the belt between the rolls, combined with a peripherally-grooved friction-surface rotatable with the driving-wheel, a V-shaped flexible band coöperating therewith, and connections between said band and one of the guide-rolls, to tighten the V-shaped band, when the direction of rotation of the roll is reversed, substantially as described.

4. In a bicycle or the like, a driving-wheel, a brake member secured thereto, a clutch-sheave loosely mounted upon the wheel-hub, dogs carried by said sheaves to engage the hub and rotate the wheel in one direction, a crank-shaft, a sheave fast thereon, and a slack driving-belt connecting said sheaves, combined with a compressible brake member, a guide-roll adjacent to and to hold the belt against the clutch-sheave and forming one member of a normally inoperative clutch, and a second member of said clutch connected to the compressible brake member, retrograde movement of the driving-belt reversing the direction of rotation of said guide-roll and simultaneously releasing the clutch-sheave on the driving-wheel and actuating the normally inoperative clutch to set the brake, and maintain it set, substantially as described.

5. In a bicycle or the like, a driving-wheel, normally operative clutch mechanism to rotate it in one direction, a crank-shaft, and connections between said shaft and clutch mechanism, combined with a brake for the driving-wheel, and an actuator therefor comprising a normally inoperative clutch controlled by the direction of rotation of the crank-shaft, retrograde movement of the crank-shaft simultaneously releasing the propelling clutch mechanism and throwing into operation the brake-actuator clutch, substantially as described.

6. In a coasting and braking device for cycles, the combination with a driving-belt, a clutch, and a brake, of means engaging the driving-belt and connected with the brake, for operating the same when the driving movement of the belt is reversed.

7. In a cycle, a driving-wheel and its shaft, an independent pedal-shaft, and a connection between said pedal-shaft and the driving-wheel, including a clutch and a power-transmitting member, combined with a brake, and means controlled by the pedal-shaft to operate the brake.

8. In a cycle, a driving-wheel and its shaft, an independent pedal-shaft, and a connection between said pedal-shaft and the driving-wheel, including a clutch and an endless flexible power-transmitting member, combined with a brake, and means controlled by the pedal-shaft to operate the brake.

In testimony whereof I have signed my name to this specification in the presence of two subscribing witnesses.

JOSEPH A. LITTLE.

Witnesses:
  JOHN C. EDWARDS,
  EMMA J. BENNETT.